US012630099B2

(12) United States Patent
    Cappuccio

(10) Patent No.: US 12,630,099 B2
(45) Date of Patent: May 19, 2026

(54) STORAGE ENCLOSURE FOR ROLLBACK VEHICLES

(71) Applicant: Louis W. Cappuccio, Hammonton, NJ (US)

(72) Inventor: Louis W. Cappuccio, Hammonton, NJ (US)

( * ) Notice: Subject to any disclaimer, the term of this patent is extended or adjusted under 35 U.S.C. 154(b) by 63 days.

(21) Appl. No.: 18/776,635

(22) Filed: Jul. 18, 2024

(65)           Prior Publication Data

US 2025/0033575 A1     Jan. 30, 2025

Related U.S. Application Data

(60) Provisional application No. 63/515,886, filed on Jul. 27, 2023.

(51) Int. Cl.
    *B60R 11/06*        (2006.01)
    *B60P 3/07*         (2006.01)
    *B60R 9/06*         (2006.01)

(52) U.S. Cl.
    CPC .............. *B60R 11/06* (2013.01); *B60R 9/065* (2013.01); *B60P 3/07* (2013.01)

(58) Field of Classification Search
    CPC ................................ B60R 9/065; B60R 11/06
    See application file for complete search history.

(56)               References Cited

U.S. PATENT DOCUMENTS

| | | | | |
|---|---|---|---|---|
| 2,722,352 A | * | 11/1955 | Dehnel | B25H 5/00 224/543 |
| 4,884,733 A | * | 12/1989 | Geeves | A45C 11/00 206/335 |
| 4,944,544 A | * | 7/1990 | Dick | B60R 7/02 248/206.1 |
| 5,054,668 A | * | 10/1991 | Ricchiuti | B60R 7/02 224/311 |
| 5,215,205 A | * | 6/1993 | Behlman | B60R 7/02 224/539 |
| 5,254,384 A | * | 10/1993 | Gordon | B60N 2/5628 428/95 |
| 5,597,194 A | * | 1/1997 | Daugherty | B60R 13/01 525/240 |

(Continued)

*Primary Examiner* — Justin M Larson
(74) *Attorney, Agent, or Firm* — Stuart M. Goldstein

(57)             ABSTRACT

A storage enclosure for rollback vehicles has a framework having a front wall frame member with a plurality of front wall frame member grooves. The front wall member extends the length of the storage enclosure and has a cut-out, center opening. The framework also comprises first and second lateral frame members which extend from opposite sides of the front wall member and the length the width of the enclosure and a back wall frame member which extends the length of the enclosure. The back wall frame member has a plurality of back wall frame member grooves. A plurality of partition frame members extend perpendicularly to the front wall member and parallel to the lateral frame members. The partition frame members are configured to be removeably insertable into the back and front wall frame member grooves to establish a plurality of separate compartments between the first and second lateral frame members. Perforated rubber floor mats are located with the compartments. Two of the plurality of partition frame members are configured to establish a central compartment.

7 Claims, 11 Drawing Sheets

(56)             References Cited

U.S. PATENT DOCUMENTS

| | | | | | |
|---|---|---|---|---|---|
| 5,730,577 | A * | 3/1998 | Jones | | B60P 1/43 |
| | | | | | 414/522 |
| 6,234,559 | B1 * | 5/2001 | Block | | B60J 7/1621 |
| | | | | | 296/100.06 |
| 6,460,744 | B2 * | 10/2002 | Lance | | B60P 3/14 |
| | | | | | 224/547 |
| 6,733,060 | B1 * | 5/2004 | Pavkov | | B60R 5/04 |
| | | | | | 224/543 |
| 6,955,385 | B1 * | 10/2005 | Boyer | | B62D 33/02 |
| | | | | | 296/37.6 |
| 6,974,171 | B1 * | 12/2005 | Taylor | | B60R 11/06 |
| | | | | | 160/40 |
| 7,182,177 | B1 * | 2/2007 | Simnacher | | B66F 3/12 |
| | | | | | 224/404 |
| 7,445,268 | B2 * | 11/2008 | Faulkiner | | B60P 1/431 |
| | | | | | 296/183.1 |
| 7,794,003 | B2 * | 9/2010 | Crandall | | B60R 9/00 |
| | | | | | 224/403 |
| 8,393,665 | B2 * | 3/2013 | Villano | | B60R 9/065 |
| | | | | | 224/543 |
| 8,839,998 | B1 * | 9/2014 | Robinson | | B60R 11/06 |
| | | | | | 224/403 |
| 9,096,180 | B1 * | 8/2015 | Malin | | B60R 11/06 |
| 9,248,314 | B2 * | 2/2016 | Calkins | | A61B 6/4085 |
| 9,499,106 | B2 * | 11/2016 | Reed, III | | B60R 11/06 |
| 9,694,754 | B2 * | 7/2017 | Sterling | | B60R 5/04 |
| 10,272,816 | B1 * | 4/2019 | Watkins | | B60P 3/07 |
| 10,513,228 | B2 * | 12/2019 | Steele | | E06B 1/52 |
| 11,001,205 | B2 * | 5/2021 | Reed, III | | B60R 9/065 |
| 11,186,228 | B2 * | 11/2021 | Sawant | | B60R 7/04 |
| 11,273,770 | B2 * | 3/2022 | Cappuccio | | B60R 9/065 |
| 2007/0262602 | A1 * | 11/2007 | Nagle | | B62D 33/0273 |
| | | | | | 296/51 |
| 2011/0018411 | A1 * | 1/2011 | Steiger | | B60R 11/06 |
| | | | | | 312/237 |
| 2018/0312115 | A1 * | 11/2018 | Reed | | B60Q 3/30 |
| 2021/0253039 | A1 * | 8/2021 | Cappuccio | | B60R 9/065 |
| 2023/0097527 | A1 * | 3/2023 | Hoff | | B66C 13/44 |
| | | | | | 414/563 |
| 2023/0294589 | A1 * | 9/2023 | Jester | | B66C 23/62 |
| | | | | | 280/6.15 |
| 2025/0033575 | A1 * | 1/2025 | Cappuccio | | B60R 11/06 |

* cited by examiner

STORAGE ENCLOSURE FOR ROLLBACK VEHICLES

RELATED APPLICATION

This application claims the benefit of application Ser. No. 63/515,886, filed on Jul. 27, 2023.

FIELD OF THE INVENTION

The present invention generally relates to the field of automobile transport or rollback vehicles, and more particularly to tool storage enclosures for these types of vehicles.

BACKGROUND OF THE INVENTION

Rollbacks are the vehicles of choice in transporting automobiles, pick-up and other smaller trucks, and similar vehicles. A variety of tools, chains, and belts, and other rollback equipment and devices are utilized during the process of mounting, securing and maintaining vehicles on rollbacks. However, when this equipment is not being used, it is most often left lying around loose on or around the bed surface of the rollback in a haphazard manner, unorganized, and unsecured on the vehicle. This situation exposes expensive tools and other equipment to the elements, e.g. rain, ice, extreme temperatures. It creates an environment which promotes theft. As a practical matter, tools which are scattered about also will result in time wasted in locating such tools and their potential loss. Importantly, disorganized, scattered tools present a real safety hazard.

SUMMARY OF THE INVENTION

It is thus the object of the present invention to provide a storage enclosure specifically designed for rollback vehicles having bed mounted winches in which tools and other equipment can be safely stored and are readily accessible when needed.

It is a further object of the present invention to provide a storage enclosure for rollback vehicles which allows for the protection of bed mounted winches from damage.

It is another object of the present invention to provide a storage enclosure for rollback vehicles which creates additional storage capability and organization for tools and equipment.

It is still another object of the present invention to provide a storage enclosure for rollback vehicles which protects tools and equipment and bed mounted winches from the weather and prevents theft.

It is a further object of the present invention to provide a storage enclosure for rollback vehicles which consolidates and houses tools and equipment, thereby eliminating safety hazards created by loose and scattered tools and equipment.

It is a further object of the present invention to provide unique and functional improvements to that which is disclosed in U.S. Pat. No. 11,273,770, the subject matter of which is incorporated by reference herein.

These and other objects are accomplished by the present invention, a storage enclosure for rollback vehicles comprising a storage enclosure framework having a front wall frame member with a plurality of front wall frame member grooves. The front wall member extends the length of the storage enclosure and has a cut-out, center opening. The framework also comprises first and second lateral frame members which extend from opposite sides of the front wall member and the length the width of the enclosure and a back wall frame member which extends the length of the enclosure. The back wall frame member has a plurality of back wall frame member grooves. A plurality of partition frame members extend perpendicularly to the front wall member and parallel to the lateral frame members. The partition frame members are configured to be removeably insertable into the back and front wall frame member grooves to establish a plurality of separate compartments between the first and second lateral frame members. Perforated rubber floor mats are located with the compartments. Two of the plurality of partition frame members are configured to establish a central compartment. The central compartment encloses the spooled cable winch of the rollback vehicle and the center opening allows cable from the winch to extend out the center opening. A hinged protective cover plate overlays the enclosure framework. Connector tabs are provided to attach the enclosure to the bed of the vehicle.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
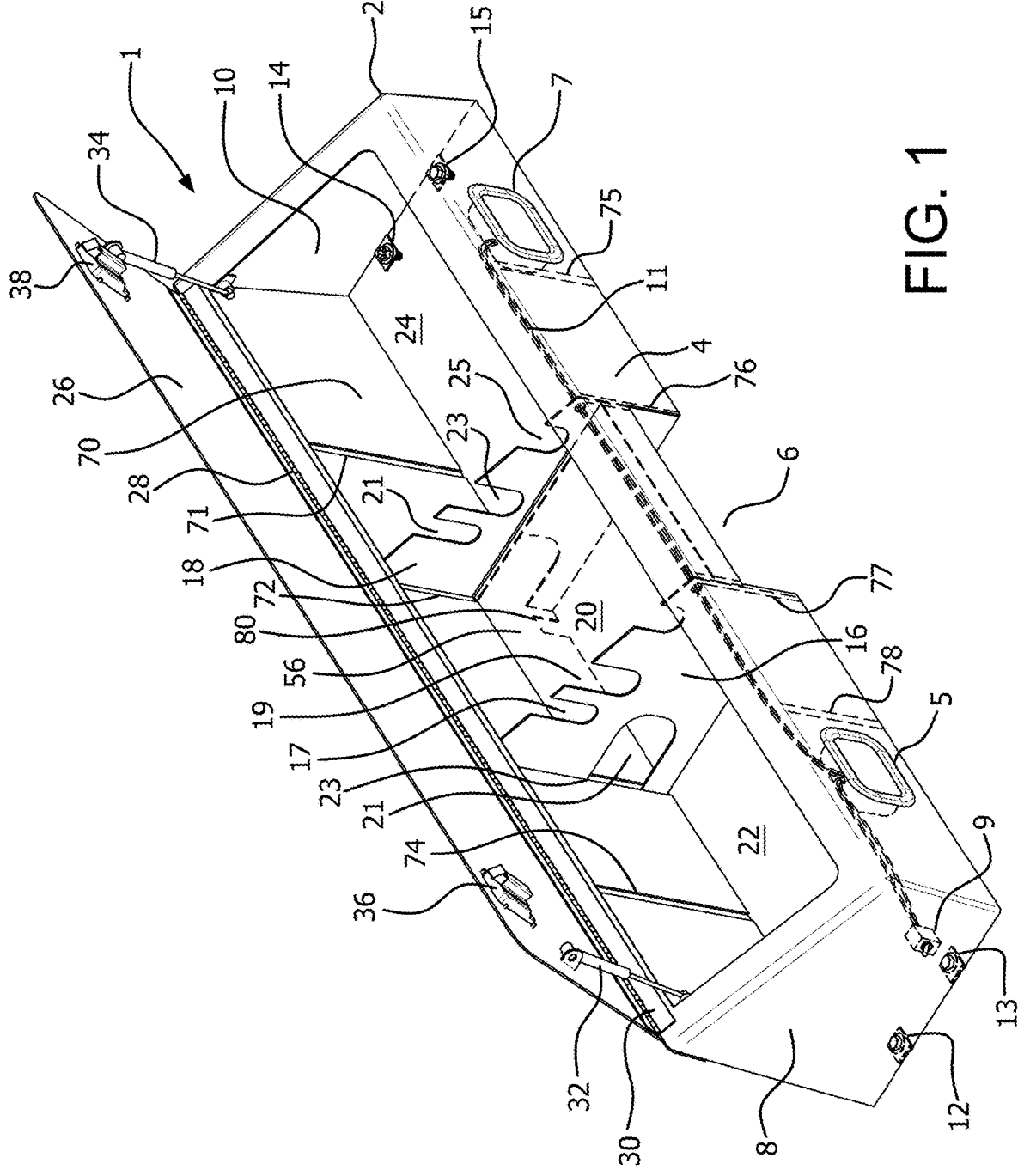
FIG. 1 is a front perspective view of the storage enclosure of the present invention, with its winch cover plate opened, showing internals of the enclosure.

With reference to FIGS. 1-5, storage enclosure 1 of the present invention comprises storage enclosure framework 2 which has front wall frame member 4 which extends the length of the enclosure and cut-out, center opening 6. Front wall frame member 4 has openings for the positioning of electrical lighting lamps 5 and 7 having internal protective boxes 55 and 57. These boxes protect the lights from tools or heavy objects. They are designed to allow access to remove or replace the lights.

Lamps 5 and 7 provide interior lighting which allows the operator/user to easily see the tools in storage enclosure in the evening when searching for them. Electrical light strips can be added to the front, back, sides and front of the interior of storage enclosure 1 to provide additional lighting. Wiring attached to lamps 5 and 7 are wired into the truck bed marker lamps. A light switch for the interior light system can be spring loaded, to be lit only when cover plate 26 is opened. Switch 9 on framework 2, or optionally positioned on the rollback vehicle itself, is electrically connected via wiring 11, to the vehicle electrical system.

Framework 2 also comprises lateral frame members 8 and 10 extending from opposite ends of front wall frame member 4. Lateral frame members 8 and 10 extend the width of framework 2. Attachment means in the form of connector tabs 12, 13, 14, and 15 extend from lateral frame member 8.

Partition frame members 16 and 18, having indented slots 17, 19, 21, 23, and 25, are attached to and extend perpendicularly to front wall frame member 4 and parallel to lateral frame members 8 and 10. Partition frame member 16 is positioned within front wall groove 77 and back wall groove 73 at its inboard and outboard ends. Partition frame member 18 is positioned within front wall groove 76 and back wall groove 72 at its inboard and outboard ends. These partition frame members establish central compartment 20 and lateral compartments 22 and 24 between lateral frame members 8 and 10.

The sizes of the compartments in storage enclosure 1 can be changed simply by sliding one or both of partition frames 16 and 18 up from grooves 73 and 77, and 72 and 76, removing the partition frames from the grooves and inserting them into opposite facing back wall groove 74 and front wall groove 78 and/or back wall groove 71 and front wall groove 75. The invention contemplates the use of additional partition frames slid into the grooves to create multiple smaller compartments.

Cover plate 26 is rotatably mounted by piano hinge 28 to rear support 30, which itself is secured both to partition frame members 16 and 18 and lateral frame members 8 and 10. Piston operated gas shock supports 32 and 34 extend between cover plate 26 and lateral frame members 8 and 10. Cover plate 26 can be removed or allowed to remain open by disconnecting gas shock supports 32 and 34. Latches 36 and 38 secure cover plate 26 in a closed position over framework 2 and hence cover compartments 20, 22, and 24. It is contemplated that any type of known latch can be utilized and this invention is not to be restricted to the latches disclosed herein.

Figure 2:
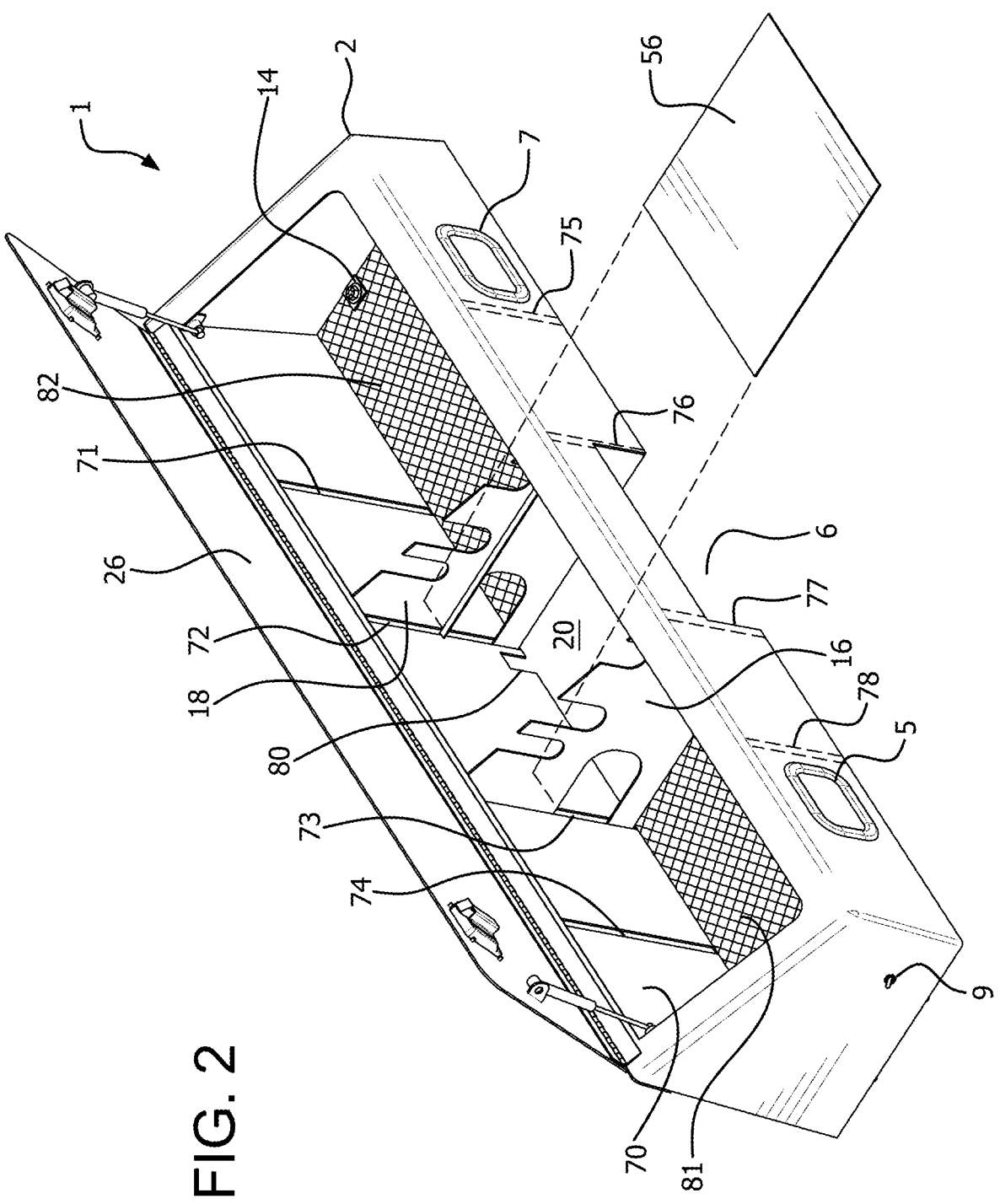
FIG. 2 is another perspective view of the storage enclosure of the present invention with its cover plate open, the positioning of the winch cover plate, and perforated floor mats.

FIG. 2 shows the use of perforated, rubber type floor mats 81 and 82. The rubber floor mat type material is necessary since the flooring on most rollback trucks is perforated steel, so that there can be air flow through the flooring. Placing these rubber mats om the flooring will still allow air filtration in the box and, importantly, also prevent salt, rain water, oil, etc. from accumulating in the enclosure. Air flow within the enclosure will also eliminate combustion concerns. In addition, the floor mats serve to prevent tools, dirt, and other matter from dropping through or getting caught or jammed in the flooring perforations. The mats will also prevent tools from rusting, by eliminating moisture build-up from the exterior of the enclosure to its interior. They will create a noise barrier when tools are dropped in the enclosure. The mats are easily removeable when they need to be cleaned.

Figure 4:
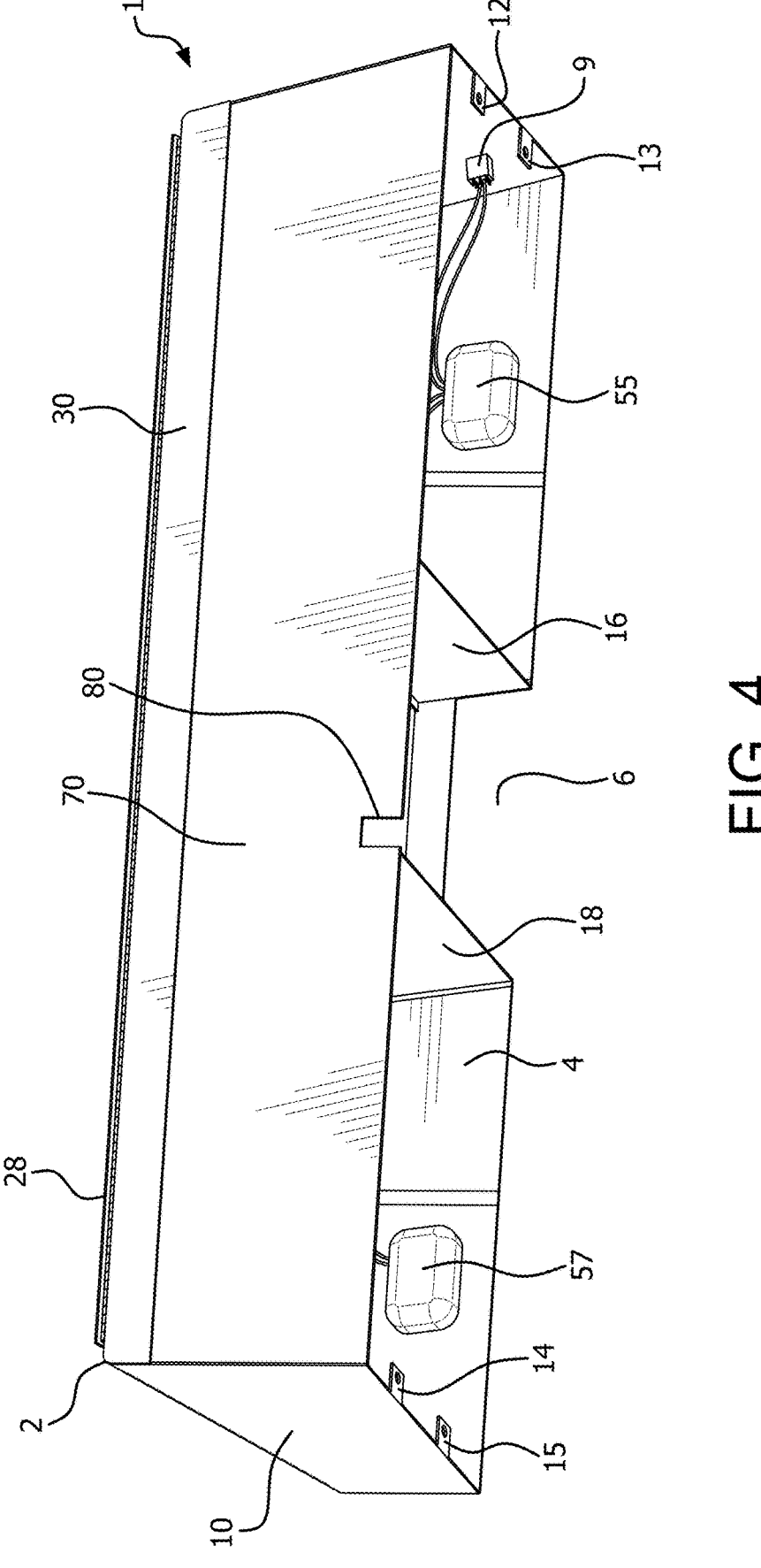
FIG. 4 is a rear perspective view of the storage enclosure of the present invention with its back wall.

FIG. 4 illustrates the inclusion of back wall 70 extending the length of storage enclosure 1 between lateral frame members 8 and 10. Back wall 70 has cut-out opening 80 to accommodate the release arm of the winch.

Figure 5:
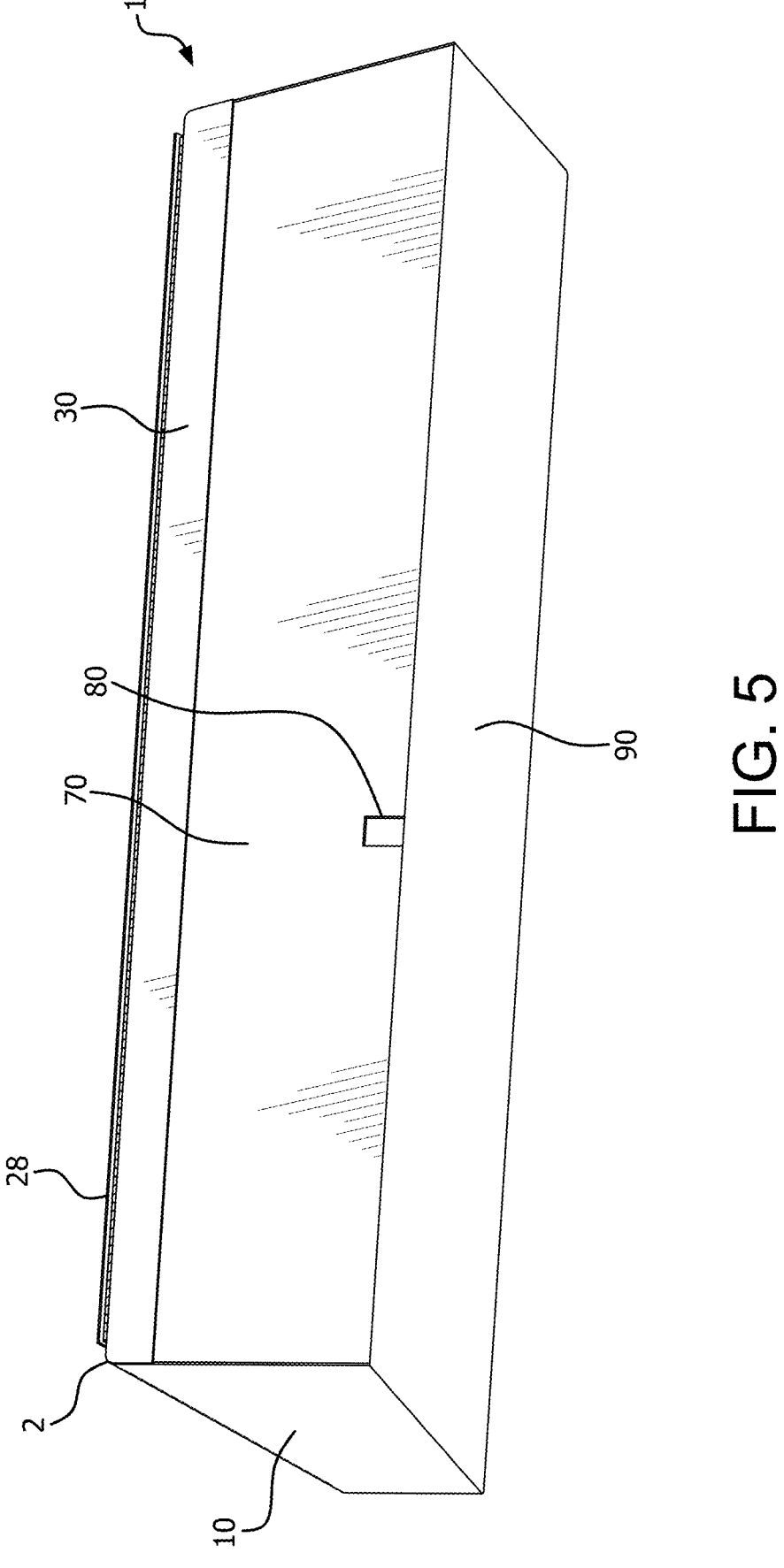
FIG. 5 is a rear perspective view of the storage enclosure of the present invention with its back wall and bottom floor.

FIG. 5 illustrates the inclusion of bottom floor 90 extending the length of storage enclosure 1, between lateral frame members 8 and 10. In tandem with the inclusion of back wall 70, storage enclosure 1 is completely closed, e.g. for in flatbed applications.

Figure 6:
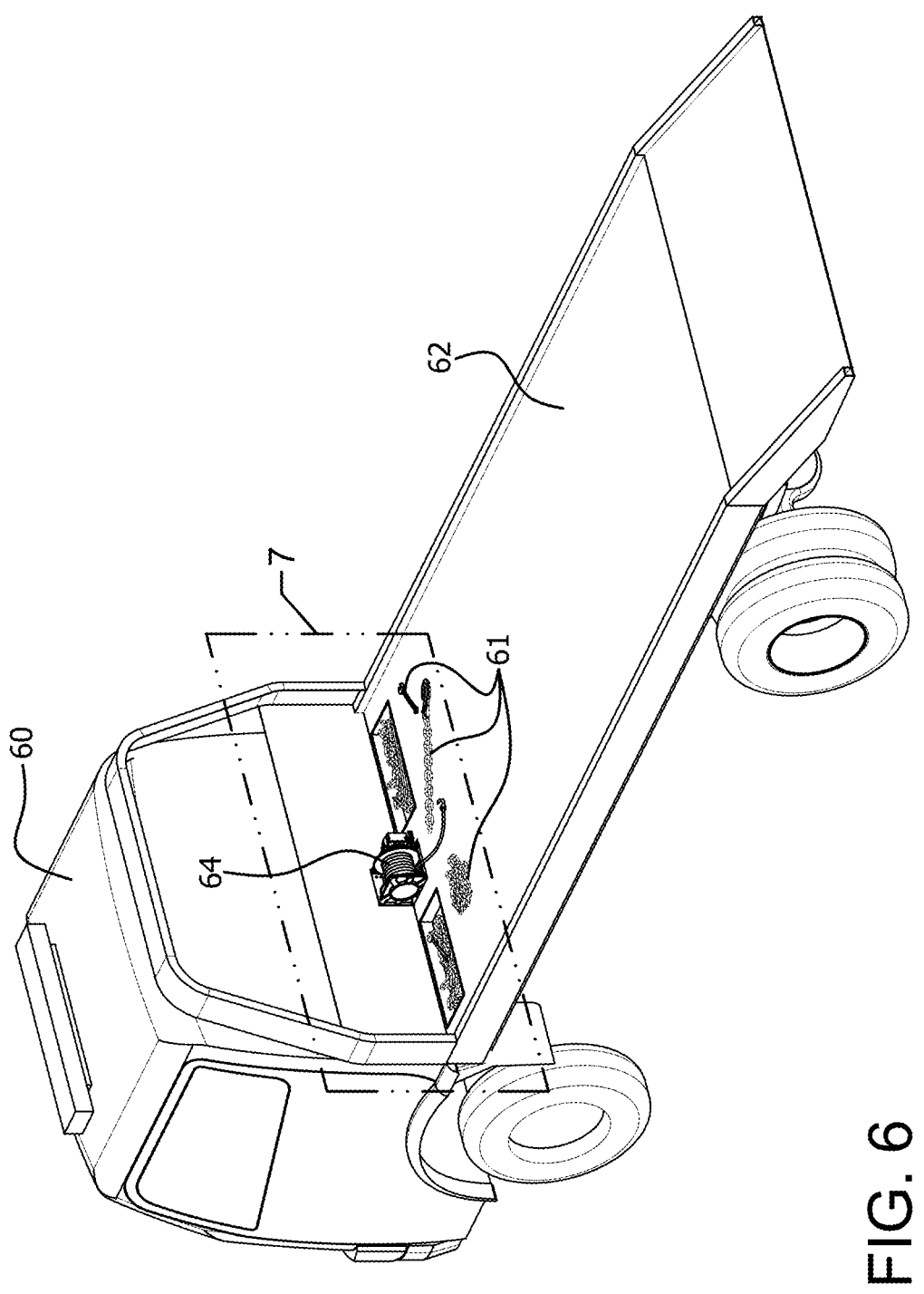
FIGS. 6 and 7 are perspective views of a typical rollback truck bed on which there are a winch, chains, tools, and other equipment, but without the benefit of the present invention.
Figure 7:
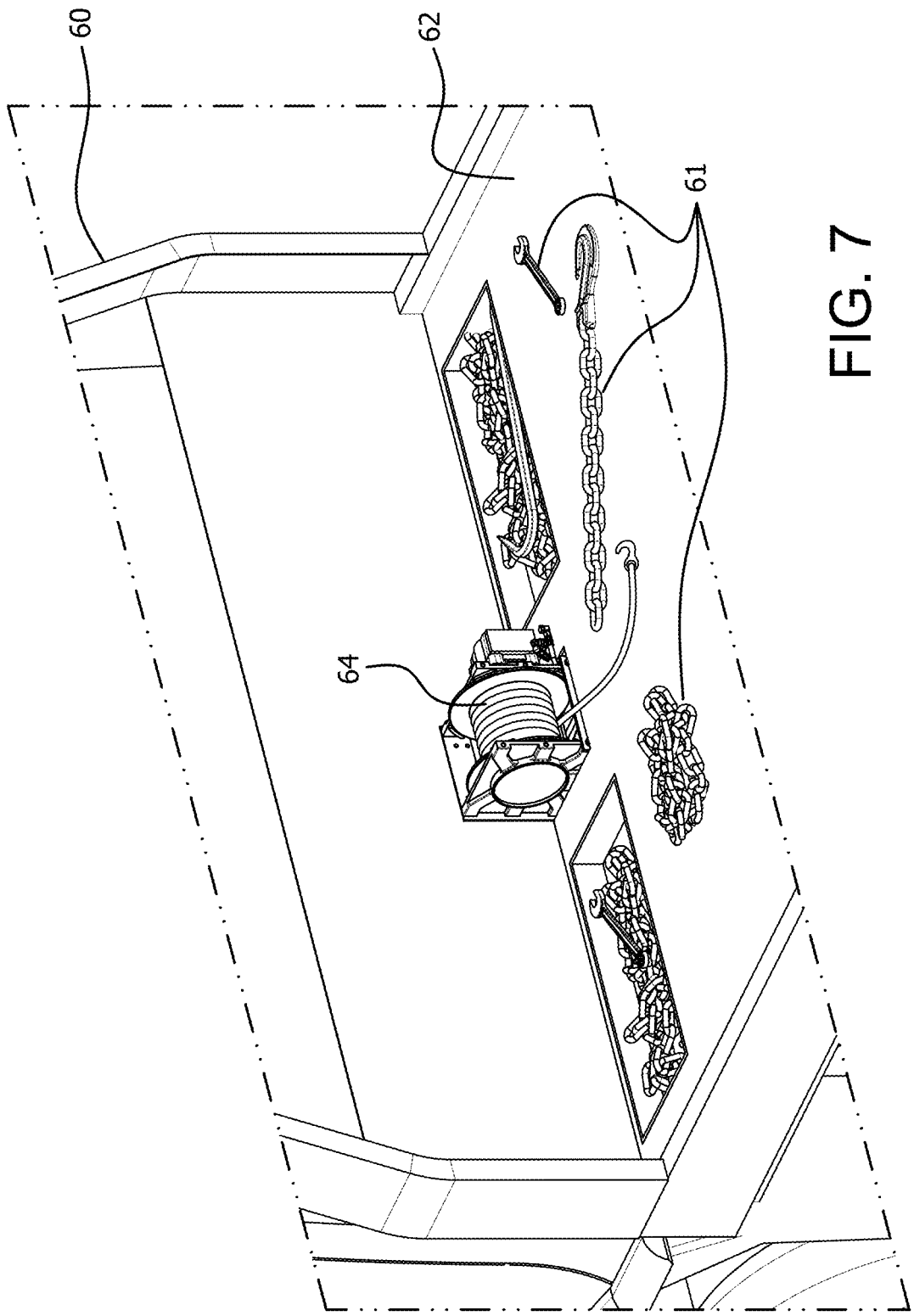
Figure 8:
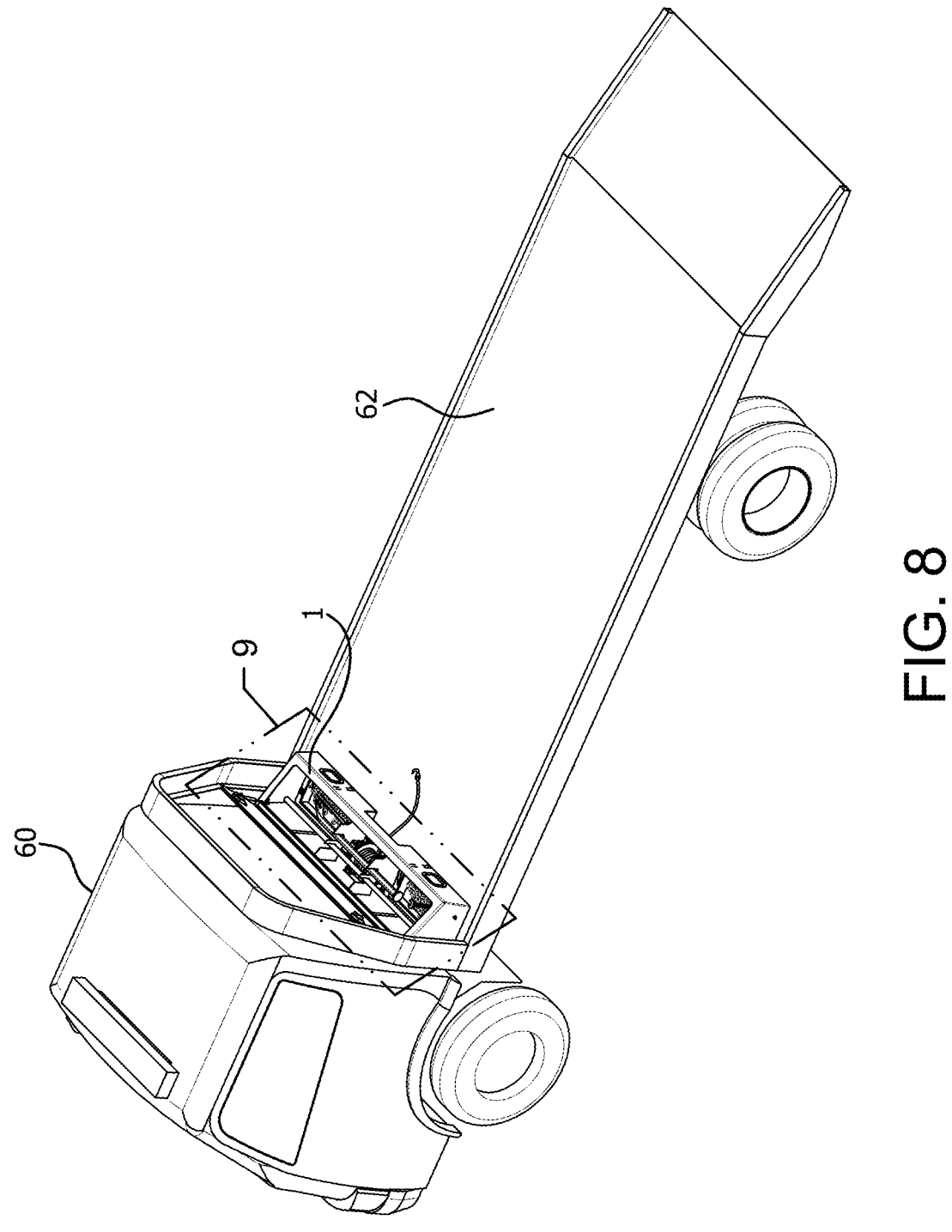
FIGS. 8 and 9 are rear perspective views of a rollback truck bed with the storage enclosure of the present invention installed and its cover plate open.
Figure 9:
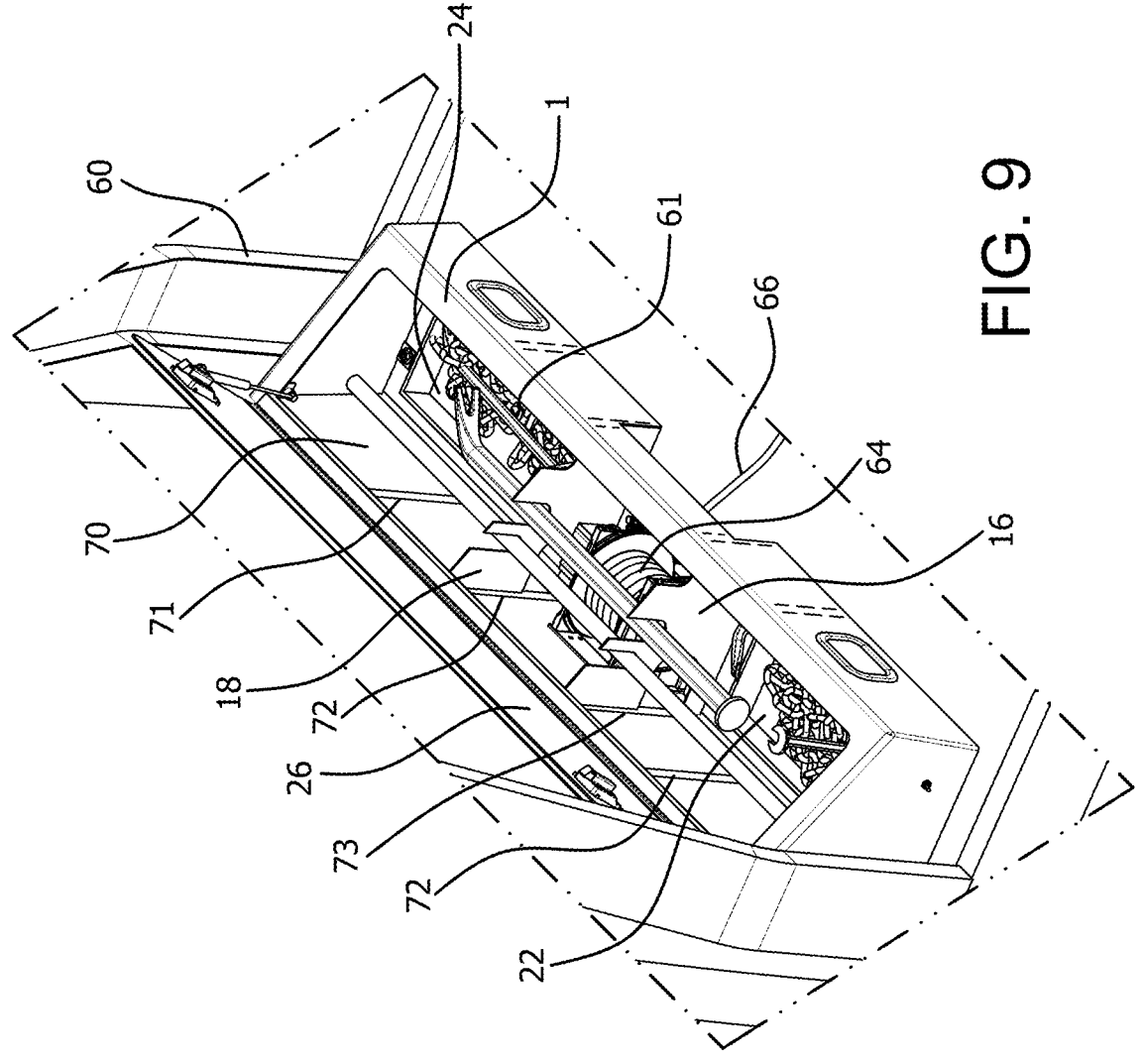
Figure 10:
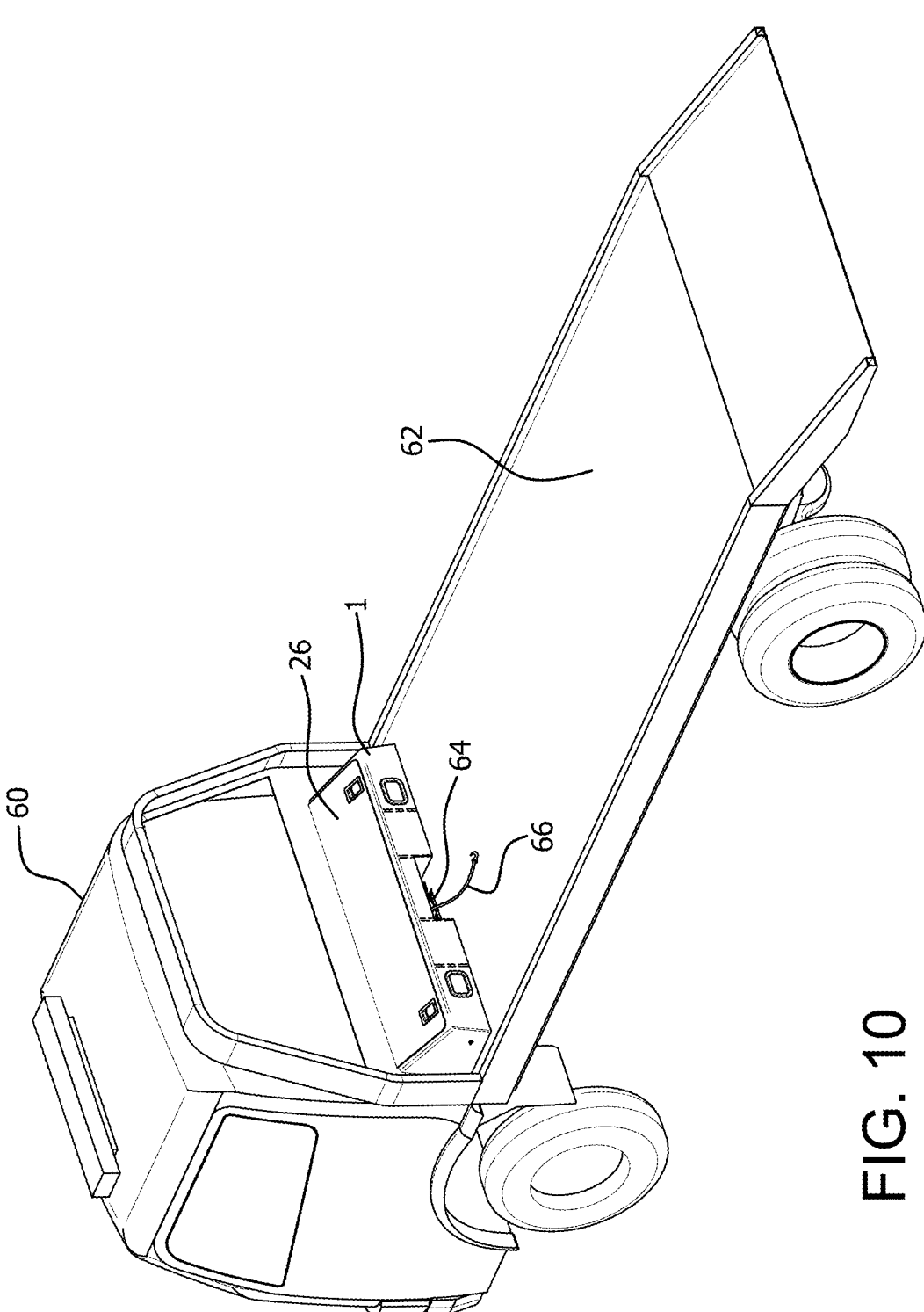
FIG. 10 is a rear perspective view of a rollback truck bed with the storage enclosure of the present invention installed and with its cover plate closed.

FIGS. 6 and 7 illustrate the disarray of tools and equipment 61 which is commonly found on bed 62 of a rollback vehicle 60 having spooled cable winch 64. On the other hand, FIGS. 8 and 9 show how the storage enclosure 1 of the present invention on the body of a rollback vehicle eliminates the problems associated with the storage, safety, theft, and general protection of equipment and tools.

Figure 3:
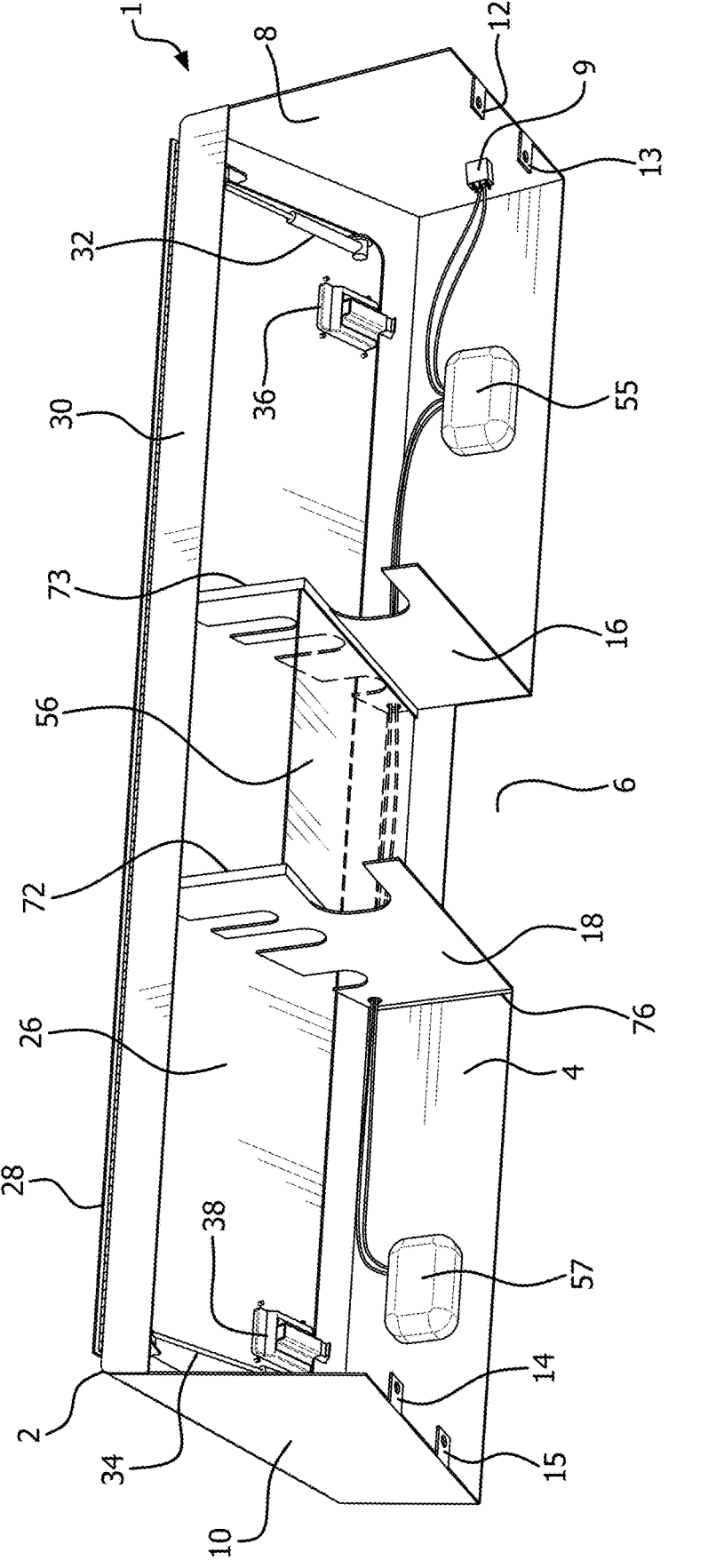
FIG. 3 is a rear perspective view of the storage enclosure of the present invention with its cover plate closed.

Storage enclosure 1 is secured to vehicle bed 62 of rollback vehicle 60 by connector tabs 12, 13, 14, and 15, via J-hooks attached to a meshed truck bed, by bolts through a solid bed, or other equivalent attachment means. Additional storage space over vehicle bed 62 for tools and equipment 61 is accomplished by means of compartments 22 and 24. Partition frame members 16 and 18 provide additional storage capability for elongated tools using slots 17, 19, 21, 23, and 25. Center compartment 20 provides a space for winch 64 of vehicle 60 and cut-out center opening 6 allows winch cable 66 to extend out storage enclosure 1. Removeable winch cover plate 56 is configured to cover and protect winch 54 in central compartment 20, as best seen in FIGS. 1 and 3. Additional storage space is provided over winch cover plate 56, which is supported by partition frame members 16 and 18.

Figure 11:
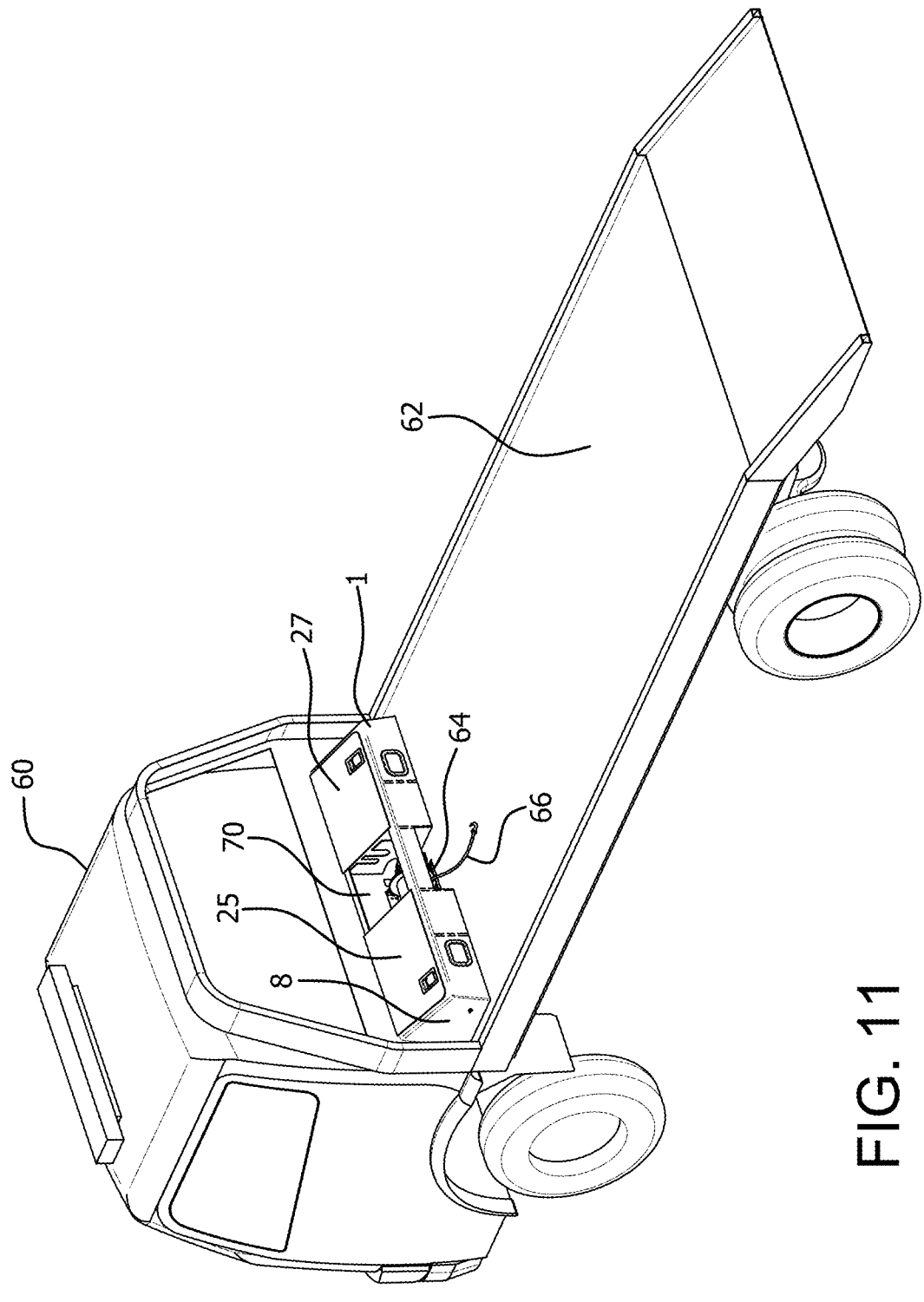
FIG. 11 is a front view of the storage enclosure of the present invention showing an alternate storage enclosure design.

FIG. 11 illustrates an alternate embodiment of the invention in which storage enclosure 1 has dual cover plates 25 and 27. These can optionally be hinged for opening at lateral frame members 8 and 10, at back wall member 70, or they can be totally separable and removeable.

It is contemplated that storage enclosure 1 of the present invention can be used on any type of flatbed truck vehicle. On those vehicles which have large winches, the storage enclosure can be fabricated to accommodate these and any size winches. The invention is not to be considered restricted to that which is disclosed herein or to any required dimensions.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A tool storage enclosure for a rollback vehicle having a vehicle bed on which a spooled cable winch having a release arm is supported, said storage enclosure having a given length and a given width and comprising:

a storage enclosure framework comprising:

a front wall frame member extending the length of the enclosure, said front wall frame member having a cut-out, center opening and a plurality of front wall frame member grooves;

a back wall frame member extending the length of the enclosure and having a plurality of back wall frame member grooves, said back wall frame member comprising a cut-out opening to accommodate the release arm of the spooled cable winch;

first and second lateral frame members extending from opposite sides of the front wall frame member and extending the width of the storage enclosure; and a plurality of partition frame members extending perpendicularly to the front wall frame member and parallel to the lateral frame members, said partition frame members being insertable into one of the plurality of front wall frame member grooves and one of the plurality of back wall frame member grooves to establish a plurality of separate compartments of given widths between the first and second lateral frame members, the partition frame members being removeable from said front and back wall frame member grooves and are configured to be inserted into different front and back wall frame member grooves to establish compartments of varying different widths, and wherein one of the compartments is configured to enclose the spooled cable winch to allow cable from the winch to extend out the center opening; and enclosure attachment means to secure the storage enclosure to the rollback vehicle.

2. The tool storage enclosure as in claim 1 further comprising a protective cover plate overlaying the enclosure framework configured to be lifted up to gain access to the compartments in the enclosure, and a removeable winch cover plate supported by two of said plurality of partition frame members.

3. The tool storage enclosure as in claim 1 further comprising openings through the front wall frame member configured to accept lighting lamps.

4. The tool storage enclosure as in claim 1 wherein the attachment means comprises connector tabs protruding from the lateral frame members of the storage enclosure framework for securing the storage enclosure to the vehicle bed of the rollback vehicle.

5. The tool storage enclosure as in claim 1 further comprising a bottom floor extending the length of the enclosure.

6. The tool storage enclosure as in claim 1 further comprising perforated floor mats removeably positioned within the compartments.

7. The tool storage enclosure as in claim 1 further comprising dual protective cover plates overlaying the enclosure frame, each cover plate being configured to be lifted up to gain access to the compartments in the enclosure.

* * * * *